(12) United States Patent
Jetten et al.

(10) Patent No.: US 7,072,551 B1
(45) Date of Patent: Jul. 4, 2006

(54) SINGLE MODE OPTICAL FIBER WITH PARTICULAR GRADED INDEX AS WELL AS OPTICAL COMMUNICATION SYSTEM

(75) Inventors: Mark Peter Marie Jetten, Weert (NL); Pieter Matthijsse, Hapert (NL)

(73) Assignee: Drake Fibre Technology B.V., Eindhoven (NL)

( * ) Notice: Subject to any disclaimer, the term of this patent is extended or adjusted under 35 U.S.C. 154(b) by 135 days.

(21) Appl. No.: 10/455,429

(22) Filed: Jun. 6, 2003

(30) Foreign Application Priority Data

Jun. 6, 2002 (NL) .................................... 1020780

(51) Int. Cl.
*G02B 6/02* (2006.01)
*G02B 6/18* (2006.01)

(52) U.S. Cl. ..................................... 385/124

(58) Field of Classification Search ...................... None
See application file for complete search history.

(56) References Cited

U.S. PATENT DOCUMENTS 5,940,567 A   8/1999   Garito 6,396,987 B1   5/2002   De Montmorillon et al.

FOREIGN PATENT DOCUMENTS

| EP | 0 249 230 | 12/1987 |
| EP | 0 775 924 | 5/1997 |
| EP | 0 785 448 | 7/1997 |
| EP | 0 789 257 | 8/1997 |
| EP | 1 000 909 | 5/2000 |

OTHER PUBLICATIONS

P. Nouchi, OFC '98 Technical Digest, Optical Fiber Communication Conference and Exhibit, vol. 2, XP-000961588, pp. 303-304, "Maximum Effective Area for Non-Zero Dispersion-Shifted Fiber", 1998.

*Primary Examiner*—Frank G. Font
*Assistant Examiner*—T. L. Rude
(74) *Attorney, Agent, or Firm*—Oblon, Spivak, McClelland, Maier & Neustadt, P.C.

(57) ABSTRACT

The present invention relates to a single mode optical fibre comprising a first central region having a radius r1, a maximum refractive index value n1 and at least one second ring surrounding said first central region, which second ring has a radius r2 and a minimum refractive index value n2, wherein n2<n1. The present invention furthermore relates to an optical communication system for multi-channel signal transmission.

9 Claims, 2 Drawing Sheets

Figure 1:
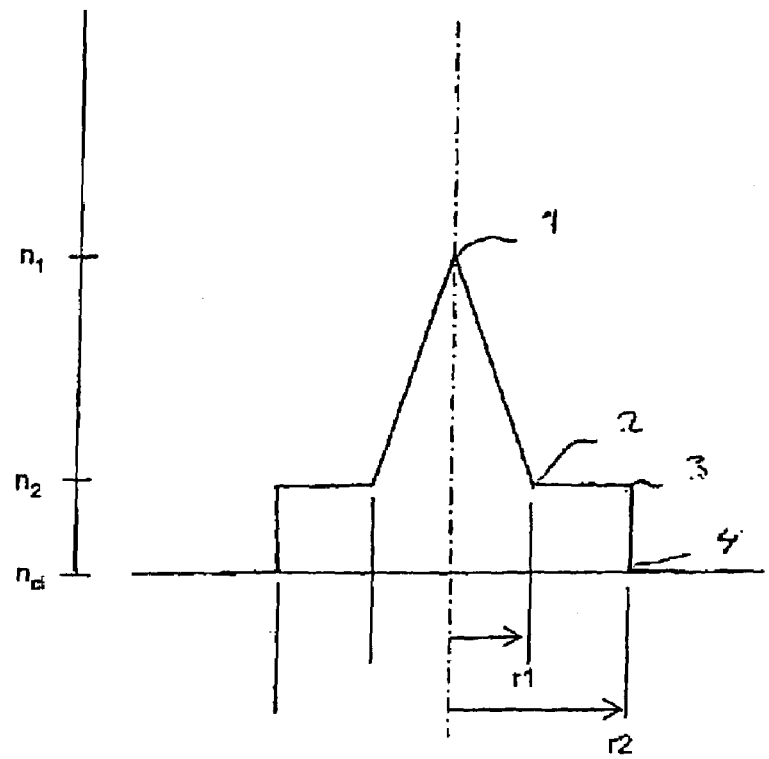

SINGLE MODE OPTICAL FIBER WITH PARTICULAR GRADED INDEX AS WELL AS OPTICAL COMMUNICATION SYSTEM

The present invention relates to a single mode optical fibre comprising a first central region having a radius r1, a maximum refractive index value n1 and at least one second ring surrounding said first central region, which second ring has a radius r2 and a minimum refractive index value n2, wherein n2<n1.

Such a single mode optical fibre is known per se from U.S. Pat. No. 5,905,838, wherein in particular FIG. 4 schematically shows the normalised refractive index difference, as a function of radial position for the four region fibre. Thus the silica core doped with germanium is surrounded by an annular region of depressed index, in this instance, composed of fluorine-doped silica. Surrounding the region is a germano-silica ring, in turn within an outer cladding region of, for example, undoped silica. The core region shows a depressed-index dip characteristic of MCVD-produced fibre. Such a fibre is also defined as a so-called "double window WDM ("wavelength division multiplexed") fibre", which fibre is used in so-called metro networks or long-distance networks. Such networks are characterized by medium-length transmission distances of up to a few hundred kilometres and a large number of nodes, where branches and/or connections to other (parts of) networks are present. The optical fibres via which the transmission of signals takes place in such networks are preferably suitable for high transmission rates at a large number of different wavelengths.

The article "Maximum effective area for non-zero dispersion-shifted fibre" discloses refractive index profiles in which a fibre of this type has a dispersion slope of 0.08 ps/nm².km at 1550 nm. The effective area at 1550 nm is in the 45–110 μm² range. Further details with regard to the slope for obtaining a satisfactory equilibrium of characteristics, in particular as regards the dispersion slope, macro bending and effective area, are not known therefrom.

U.S. Pat. No. 6,396,987 relates to an optical fibre for use in WDM transmission systems, wherein the effective area is larger than or equal to 60 μm² and the dispersion value ranges from 6 to 10 ps/(nm.km).

European patent application No. 0 249 230 relates to a method for manufacturing a preform. Since said document only relates to preforms, no specific details are provided with regard to the optical fibre drawn from such a preform, such as the value of the dispersion slope, the dispersion value or the effective area.

European patent application No. 0 775 924 relates to a single mode optical fibre having a three-segment index profile. Although the zero dispersion wavelength is in the 1520–1600 nm range, the total dispersion slope may be ≦0.095 ps/μm².km. No details are provided with regard to the slope required for obtaining a satisfactory equilibrium of characteristics as regards the dispersion slope, macro bending and effective area.

In the case of very long distances (distances of 1000 km and longer) optical fibres for high transmission rates are optimised for use in wavelength range around 1550 nm, in which wavelength range the optical attenuation may be considered low (about 0.2 dB/km). The NZDF ("non-zero dispersion fibres") also have shifted dispersion, as a result of which the dispersion at a wavelength of 1550 nm is lower than that of a standard single mode fibre. The dispersion value deviates sufficiently from zero, however, for minimising the effect of non-linear characteristics that may have a seriously adverse effect on the allowable maximum transmission capacity.

Because of the relatively short distances in the aforesaid networks, less strict requirements are made of the optical attenuation, as a result of which also the wavelength range around 1300 nm, which has a characteristic attenuation of about 0.3 dB/km, is in principle suitable for such applications. As a result of the optimisation thereof in the 1550 nm wavelength range, the fibres used for long-distance transmission are less suitable for use in the wavelength range around 1300 nm, however.

It is an object of the present invention to provide a single mode optical fibre suitable for multichannel transmission in the wavelength range around 1550 nm, viz. 1440 nm–1625 nm, and the wavelength range around 1300 nm, viz. 1250 nm–1360 nm, using high transmission rates.

Another object of the present invention is to provide a single mode optical fibre in which the profile of the optical fibre is designed to prevent stress variations that may lead to undesirable characteristics of the optical fibre.

The single mode optical fibre as referred to in the introduction is according to the present invention characterized in that the refractive index value ni1 is substantially constant in the first central region having radius r1, and in the second ring having radius r2 the refractive index value decreases in radial direction from n1 to n2 over a distance r1–r2, with the decrease, which is substantially linear, taking place in accordance with the following equation:

slope=(D1–D2)/(r2–r1), where 0,11<slope<0,22, and $$D_i = \frac{n_i^2 - n_{Cl}^2}{2 \cdot n_i^2} \cdot 100\% \text{ and } n_i > n_{Cl},$$

$D_i$=refractive index contrast for position i, $n_i$=refractive index of position i, $n_{Cl}$=refractive index of the outer fibre cladding.

In a special embodiment the central region, which has a substantially constant refractive index, preferably has a radius r1 having a maximum value of 0.25 μm. If the radius r1 is larger than the aforesaid value, it is not possible to obtain a fibre having a sufficiently large effective area and a sufficiently low dispersion slope.

The present invention furthermore relates to a single mode optical fibre comprising a first central region having a radius r1 and a maximum refractive index value ni1 and at least one second ring surrounding said first central region, which second ring has a radius r2 and a minimum refractive index value n2, where n2<n1, which fibre is characterized in that the refractive index value is substantially constant in the second ring and decreases in radial direction over a distance r1 from n1 to n2 from the central axis of symmetry in the first central region, with the decrease, which is substantially linear, taking place in accordance with the following equation:

slope=(D1–D2)/(r1), where 0,11<slope<0,22, and $$D_i = \frac{n_i^2 - n_{Cl}^2}{2 \cdot n_i^2} \cdot 100\% \text{ and } n_i > n_{Cl},$$

and $n_i > n_{Cl}$, wherein the meaning of $D_i$, $n_i$ and $n_{Cl}$ is as indicated above.

The present invention furthermore relates to a single mode optical fibre comprising a first central region having a radius r1 and a maximum refractive index value n1 and at least one second ring surrounding said first central region, which second ring has a radius r2 and a minimum refractive index value n2, where n2<n1, which single mode fibre is characterized in that the refractive index value is substantially constant in the second ring and decreases in radial direction over a distance r1 from n1 to n1" from the central axis of symmetry in the first central region, with the decrease, which is substantially linear, taking place in accordance with the following equation:

slope=(D1–D1")/(r1), where 0,11<slope<0,22, and $$D_i = \frac{n_i^2 - n_{Cl}^2}{2 \cdot n_i^2} \cdot 100\% \text{ and } n_i > n_{Cl},$$

$n_i > n_{Cl}$ and n1>n1">n2, wherein the meaning of $D_i$, $n_i$ and $n_{Cl}$ is as indicated above.

The present inventors have accomplished their invention on basis of this finding, with the profile of the optical fibre being so designed as to prevent undesirable stress variations. Undesirable characteristics, such as an increased PMD (or sensitivity to the hydrogen-induced attenuation losses) are thus reduced to a minimum.

In specific embodiments, the second ring having radius r2 is preferably surrounded by a third ring having a radius r3 and a refractive index value n3, wherein n3<n2 and r3>r2. In addition, the third ring having radius r3 may be surrounded by a fourth ring having a radius r4 and a refractive index value n4, wherein n4<n3 and r4>r3.

Preferably, the dispersion value of the present optical fibre is 8 ps/nm.km or higher at 1550 nm, whereas the dispersion value at 1300 nm must be –8 ps/nm.km or lower. When such dispersion values are used, it is possible to use several channels, viz. signals having different wavelengths, simultaneously in the two aforesaid wavelength ranges at high transmission rates of 10 Gbit/s or higher, without the non-linear characteristics having a limiting effect in this regard.

The present inventors have furthermore discovered that the slope in the refractive index profile is an important design parameter for achieving the right combination of characteristics of the final optical fibre. Consequently, said slope preferably ranges from 0.11 to 0.22, in particular from 0.13 to 0.19. If a slope having a value higher than the above range of values is used, the macro bending losses and the dispersion slope will be too large, which is undesirable in practice. If, on the other hand, a slope having a value lower than the above range of values is used, the effective area will be too small, which is also undesirable in practice.

In order to enable the simultaneous transmission of a large number of signals at different wavelengths without significantly limiting the power density, the present optical fibre preferably has an effective area of 60 μm² or more at a wavelength in the 1550 nm range.

Furthermore preferably, the dispersion slope for the present optical fibre ranges from 0.07 to 0.095 ps/nm.km² at 1550 nm.

In order to ensure that the present optical fibre can be considered to be a single mode optical fibre over a maximum wavelength range, the cut-off wavelength is preferably lower than 1200 nm, measured for an optical fibre having a length of 2 m.

In addition to having the features of the aforesaid preferred embodiments, the optical fibre should exhibit low losses caused by bending of the optical fibre. The fact is that many connections are made in the aforesaid networks consisting of optical fibres, for which connections loops are usually laid in the fibre at the locations of said connections. Thus it is desirable to limit the attenuation losses caused by such loops as much as possible, which preferably implies that the macro bending losses, measured at a wavelength of 1625 nm and 100 windings having a bending diameter of 60 nm, are preferably lower than 0.05 dB.

The present invention furthermore relates to an optical communication system for multi-channel signal transmission, which system is characterized in that the present fibre is used as a transmission medium for several channels in the wavelength range of either 1550 nm or 1300 nm.

The present invention will be explained in more detail hereinafter by means of embodiments, in which connection it should be noted, however, that the present invention is by no means limited to such embodiments. In the appended FIGS. 1–3, the refractive index profiles of a number of optical fibres according to a special embodiment of the invention are schematically shown as a function of the radius.

FIG. 1 shows a possible refractive index profile of a fibre according to the present invention. The position indicated at reference number 1 on said profile is a maximum refractive index substantially on the axis of symmetry, which position has a refractive index value n1 and a refractive index difference D1. The position indicated at reference number 2 is spaced from the axis of symmetry by a distance r1 and has a distinctly lower refractive index value n2 and refractive index difference D2 than the position indicated at reference number 1. The refractive index value decreases in practically linear, monotonous fashion from position 1 to position 2, with the slope h being in accordance with the following equation: h=(D1–D2)/(r1). The position indicated at 3 is spaced from the axis of symmetry by a distance r2. Finally, numeral 4 indicates a position which is spaced from the axis of symmetry by substantially the same distance as position 3, which position 4 shows the refractive index value of the cladding, which cladding extends from the axis of symmetry starting on a distance r2 and has a refractive index value lower than that of position 3.

Figure 2:
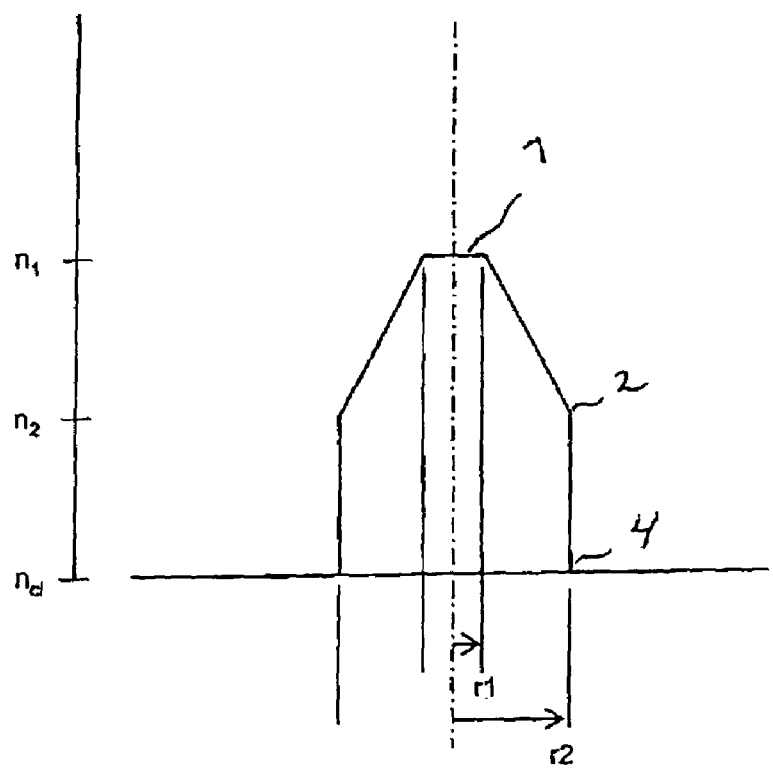

FIG. 2 shows a refractive index profile of a fibre according to the present invention. A circularly symmetric profile having a distance r1 is built up around a central axis of symmetry, in which the position indicated at reference number 1 of said profile requires a refractive index having a constant refractive index value n1. The position indicated at reference number 2 is spaced from the axis of symmetry by a distance r2 and has a distinctly lower refractive index value n2 and refractive index difference D2 than the position indicated at reference number 1. The refractive index value decreases in practically linear, monotonous fashion from position 1 to position 2, where the slope h=(D1−D2)/(r1). The position indicated at reference number 4 indicates the refractive index value of the cladding, which cladding extends from the axis of symmetry starting on a distance r2. In FIG. 2, n1>n2>nc1.

Figure 3:
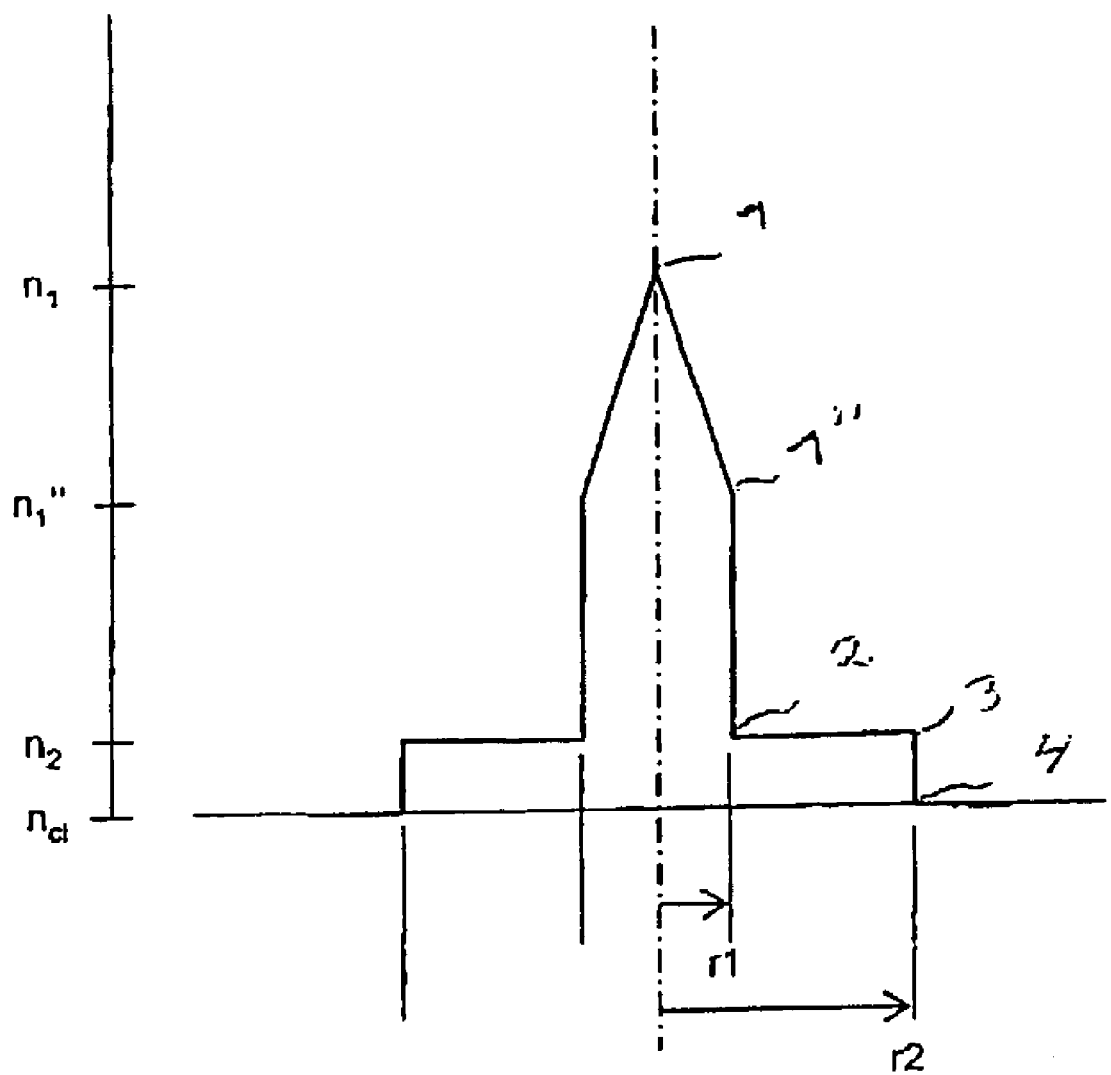

FIG. 3 shows a refractive index profile of a fibre according to the present invention. The position indicated at 1 on said profile is a maximum refractive index substantially on the axis of symmetry, which position has a refractive index value n1 and a refractive index difference D1. The position indicated at 1" is spaced from the axis of symmetry by a distance r1 and has a distinctly lower refractive index value n1" than the position indicated at 1. The refractive index value decreases in practically linear, monotonous fashion from position 1 to position 1" already. The position indicated at 2 is also spaced from the axis of symmetry by a distance r2 and has a refractive index value n2 and a refractive index difference D2. Finally, reference number 4 indicates a position which is spaced from the axis of symmetry by substantially the same distance as position 3, from which position 4 the cladding begins, which cladding has a refractive index value lower than that of position 3.

As already explained before, the slope h is an important design parameter for obtaining the right combination of characteristics of the optical fibre. Said slope h can be influenced by, for example, adapting the refractive index difference of position 2. The slope can be increased by causing the index value of position 2, in particular in FIGS. 1 and 2, to decrease. In addition to that, adaptation of the slope can also take place by changing the radial position of position 1" (see FIG. 3) and position 2 (see FIGS. 1 and 2). As already said before, the present inventors have discovered that the slope preferably ranges from 0.11 to 0.22, more in particular from 0.13 to 0.19. In the case of a slope having a value higher than the aforesaid range of values the macro bending losses will increase undesirably, whilst the result of a slope having a value lower than the aforesaid range of values will be that the desired effective area will be too small.

The influence of the slope in the refractive index profile of the profiles presented herein on a number of parameters, viz. the dispersion slope, which is preferably lower, than 0.095 ps/nm.km$^2$, the macro bending losses, which are preferably lower than 0.05 dB (measured at a wavelength of 1625 nm, windings having a bending diameter of 60 mm) and an effective area, which is preferably larger than 60 μm$^2$, has been investigated for optical fibres that meet the dispersion requirement of ≧8 ps/nm.km at 1550 nm and ≦8 ps/nm.km at 1330 nm and the cut-off wavelength requirement of <1200 m, measured on an optical fibre having a length of 2 m. The results are presented in the table below.

| Slope | Dispersion slope | Macro bending | Effective area |
|---|---|---|---|
| 0,10 | ++ | ++ | − |
| 0,12 | + | ++ | +/− |
| 0,14 | + | + | + |
| 0,16 | + | + | + |

-continued

| Slope | Dispersion slope | Macro bending | Effective area |
|---|---|---|---|
| 0,18 | + | + | + |
| 0,20 | +/− | + | + |
| 0,22 | +/− | +/− | ++ |
| 0,24 | +/− | −− | ++ |

The above table clearly shows that a satisfactory equilibrium of characteristics is obtained with a the slope in the range 0,11<slope<0,22.

We claim:

1. Single mode optical fibre comprising a first central region having a radius r1, a maximum refractive index value n1 and at least one second ring surrounding said first central region, which second ring has a radius r2 and a minimum refractive index value n2, wherein n2<n1, characterized in that the refractive index value n1 is substantially constant in the first central region having radius r1, and in the second ring having radius r2 the refractive index value decreases in radial direction from n1 to n2 over a distance r1−r2, with the decrease, which is substantially linear, taking place in accordance with the following equation:

slope=(D1−D2)/(r2−r1), where 0.11<slope<0.22, and $$D_i = \frac{n_i^2 - n_{Cl}^2}{2 \cdot n_i^2} \cdot 100\% \text{ and } n_i > n_{Cl},$$

$D_i$=refractive index contrast for position i,
$n_i$=refractive index of position i,
$n_{Cl}$=refractive index of an outer fibre cladding,
wherein a dispersion slope ranges from 0.07 to 0.095 ps/km$^2$ at 1550 nm.

2. Optical fibre according to claim 1, wherein r1<0.25 μm.

3. Optical fibre according to claim 1, characterized in that the second ring having radius r2 is surrounded by a third ring having a radius r3 and a refractive index value n3, wherein n3<n2 and r3>r2.

4. Optical fibre according to claim 1, characterized in that the third ring having radius r3 is surrounded by a fourth ring having a radius r4 and a refractive index value n4, wherein n4<n3 and r4>r3.

5. Optical fibre according to claim 1, wherein 0.13<slope<0.19.

6. Optical fibre according to claim 1, characterized in that the dispersion value is 8 ps/km or higher at 1550 nm.

7. Optical fibre according to claim 1, characterized in that the dispersion value is −8 ps/km or lower at 1300 nm.

8. Optical fibre according to claim 1, characterized in that the effective area is 60 μm$^2$ or more at 1550 nm.

9. Optical fibre according claim 1, characterized in that the cut-off wavelength is lower than 1200 nm, measured for a fibre having a length of 2 m.

* * * * *

UNITED STATES PATENT AND TRADEMARK OFFICE
CERTIFICATE OF CORRECTION

PATENT NO.         : 7,072,551 B1                                          Page 1 of 1
APPLICATION NO.    : 10/455429
DATED              : July 4, 2006
INVENTOR(S)        : Jetten et al.

It is certified that error appears in the above-identified patent and that said Letters Patent is hereby corrected as shown below:

On the title page, Item (73), the Assignee is incorrect. Item (73) should read:

-- (73) Assignee:  Draka Fibre Technology B.V.,
                   Eindhoven (NL) --

Signed and Sealed this

Nineteenth Day of September, 2006

JON W. DUDAS
*Director of the United States Patent and Trademark Office*

UNITED STATES PATENT AND TRADEMARK OFFICE
CERTIFICATE OF CORRECTION

PATENT NO. : 7,072,551 B1
APPLICATION NO. : 10/455429
DATED : July 4, 2006
INVENTOR(S) : Mark Peter Jetten et al.

It is certified that error appears in the above-identified patent and that said Letters Patent is hereby corrected as shown below:

Title page, item (54) and col. 1 should read -- (54) SINGLE MODE OPTICAL FIBRE AS WELL AS OPTICAL COMMUNICATION SYSTEM --

Signed and Sealed this

Fifth Day of June, 2007

JON W. DUDAS
*Director of the United States Patent and Trademark Office*

UNITED STATES PATENT AND TRADEMARK OFFICE
CERTIFICATE OF CORRECTION

PATENT NO. : 7,072,551 B1
APPLICATION NO. : 10/455429
DATED : July 4, 2006
INVENTOR(S) : Jetten et al.

It is certified that error appears in the above-identified patent and that said Letters Patent is hereby corrected as shown below:

In the Specification

Column 1, Line 35 reads "~~ps/nm².km~~ at 1550 nm. The effective area at 1550 nm is in"
and should read "ps/(nm² · km) at 1550 nm. The effective area at 1550 nm is in"

Column 1, Line 43 reads "ranges from 6 to 10 ~~ps/(nm.km).~~"
and should read "ranges from 6 to 10 ps/(nm · km)."

Column 1, Line 55 reads "~~≤0.095 ps/μm².km.~~ No details are provided with regard to"
and should read "≤0.095 ps/(nm² · km). No details are provided with regard to"

Column 3, Line 50 reads "is 8 ~~ps/nm.km~~ or higher at 1550 nm, whereas the dispersion"
and should read "is 8 ps/(nm · km) or higher at 1550 nm, whereas the dispersion"

Column 3, Line 51 reads "value at 1300 nm must be -8 ~~ps/nm.km~~ or lower. When such"
and should read "value at 1300 nm must be -8 ps/(nm · km) or lower. When such"

Column 4, Line 7 reads "present optical fibre ranges from 0.07 to 0.095 ~~ps/nm.km²~~ at"
and should read "present optical fibre ranges from 0.07 to 0.095 ps/(nm² · km) at"

Column 4, Line 24 reads "~~nm,~~ are preferably lower than 0.05 dB."
and should read "mm, are preferably lower than 0.05 dB."

Column 5, Line 44 reads "0.095 ~~ps/nm.km²,~~ the macro bending losses, which are"
and should read "0.095 ps/(nm² · km), the macro bending losses, which are"

Column 5, Line 49 reads "sion requirement of ≥8 ~~ps/nm.km~~ at 1550 nm and ≤8"
and should read "sion requirement of ≥8 ps/(nm · km) at 1550 nm and ≤8"

Column 5, Line 50 reads "~~ps/nm.km~~ at ~~1330~~ nm and the cut-off wavelength require-"
and should read "ps/(nm · km) at 1300 nm and the cut-off wavelength require-"

CERTIFICATE OF CORRECTION (continued)
U.S. Pat. No. 7,072,551 B1

In the Claims

Claim 1, Column 6, Line 39 reads "~~ps/km²~~ at 1550 nm."
and should read "ps/(nm² · km) at 1550 nm."

Claim 6, Column 6, Line 51 reads "the dispersion value is 8 ~~ps/km~~ or higher at 1550 nm."
and should read "the dispersion value is 8 ps/(nm · km) or higher at 1550 nm."

Claim 7, Column 6, Line 53 reads "the dispersion value is -8 ~~ps/km~~ or lower at 1300 nm."
and should read "the dispersion value is -8 ps/(nm · km) or lower at 1300 nm."

Signed and Sealed this

Twentieth Day of April, 2010

David J. Kappos
*Director of the United States Patent and Trademark Office*